(12) United States Patent
Grossi et al.

(10) Patent No.: US 9,846,863 B2
(45) Date of Patent: Dec. 19, 2017

(54) TECHNIQUES FOR AUTOMATING A RETAIL TRANSACTION

(75) Inventors: Mark Grossi, Muirhead (GB); Erick Kobres, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 835 days.

(21) Appl. No.: 13/299,702

(22) Filed: Nov. 18, 2011

(65) Prior Publication Data

US 2013/0132234 A1    May 23, 2013

(51) Int. Cl.
| | | |
|---|---|---|
| *G06Q 20/32* | (2012.01) | |
| *G06Q 20/20* | (2012.01) | |
| *G06Q 20/12* | (2012.01) | |
| G06Q 30/04 | (2012.01) | |
| G06Q 30/06 | (2012.01) | |

(52) U.S. Cl.
CPC ............. *G06Q 20/12* (2013.01); *G06Q 20/20* (2013.01); *G06Q 20/327* (2013.01); *G06Q 20/3276* (2013.01); *G06Q 30/0613* (2013.01)

(58) Field of Classification Search
CPC .... G06Q 20/012; G06Q 20/02; G06Q 20/327; G06Q 20/3276; G06Q 30/0613
USPC ..................... 705/15, 16, 26.41, 64
See application file for complete search history.

(56) References Cited

U.S. PATENT DOCUMENTS

| | | | | |
|---|---|---|---|---|
| 8,219,490 | B2 * | 7/2012 | Hammad et al. | 705/44 |
| 8,498,900 | B1 * | 7/2013 | Spirin | G06Q 50/00 340/286.09 |
| 8,505,079 | B2 * | 8/2013 | Nandakumar | 726/5 |
| 8,589,236 | B2 * | 11/2013 | Afana | 705/16 |
| 2003/0022655 | A1 * | 1/2003 | Bogat | 455/406 |
| 2005/0192895 | A1 * | 9/2005 | Rogers | G06Q 20/023 705/39 |
| 2008/0091614 | A1 * | 4/2008 | Bas Bayod | G06Q 20/04 705/71 |
| 2008/0228591 | A1 * | 9/2008 | Watanabe et al. | 705/26 |
| 2009/0055319 | A1 * | 2/2009 | Raheman | 705/44 |
| 2009/0112768 | A1 * | 4/2009 | Hammad et al. | 705/44 |
| 2009/0150218 | A1 * | 6/2009 | Brunner | G06Q 30/02 705/14.58 |
| 2010/0106649 | A1 * | 4/2010 | Annan | 705/67 |
| 2011/0093351 | A1 * | 4/2011 | Afana | 705/16 |
| 2011/0208665 | A1 * | 8/2011 | Hirsch et al. | 705/321 |
| 2011/0276418 | A1 * | 11/2011 | Velani | G06Q 20/20 705/16 |
| 2011/0307318 | A1 * | 12/2011 | LaPorte | G06Q 20/209 705/14.33 |

(Continued)

OTHER PUBLICATIONS

Briody, D., "The Mobile Banking Imperative; In search of customer loyalty, Wells Fargo joins the mobile banking brigade," CIO Insight, vol. 1, Issue 81, May 2007.*

*Primary Examiner* — Nicholas D Rosen
(74) *Attorney, Agent, or Firm* — Schwegman, Lundberg & Woessner (57) ABSTRACT

Techniques for automating a retail transaction are provided. In an embodiment, a customer of a retailer is provided a bill to complete a transaction with the retailer. The bill includes a barcode or a Quick Response (QR) code with details of the bill encoded therein. The customer, using a mobile device, scans the code. The mobile device automatically connects with a mobile transaction service and completes payment details for the customer. The retailer's system is notified that payment was received and the transaction is completed.

7 Claims, 3 Drawing Sheets

(56) References Cited

U.S. PATENT DOCUMENTS

| | | | |
|---|---|---|---|
| 2012/0101941 A1* | 4/2012 | Kang et al. | 705/40 |
| 2012/0116978 A1* | 5/2012 | Bruynse et al. | 705/72 |
| 2012/0136780 A1* | 5/2012 | El-Awady et al. | 705/40 |
| 2012/0173348 A1* | 7/2012 | Yoo et al. | 705/16 |
| 2012/0203696 A1* | 8/2012 | Morgan et al. | 705/44 |
| 2012/0290415 A1* | 11/2012 | Itwaru | 705/16 |
| 2013/0013516 A1* | 1/2013 | Hamilton | 705/75 |
| 2013/0104201 A1* | 4/2013 | Nandakumar | 726/5 |
| 2013/0110728 A1* | 5/2013 | Kobres | 705/75 |
| 2013/0124364 A1* | 5/2013 | Mittal | 705/26.41 |

\* cited by examiner

TECHNIQUES FOR AUTOMATING A RETAIL TRANSACTION

BACKGROUND

Automation for goods and services has reached record levels in society. Examples are everywhere from online banking and purchasing to a wide-range of devices and physical appliances that include computing and networking capabilities, which were just wishful dreams only a decade ago. For the most part, these advances have occurred because of breakthroughs in hardware and wireless communications, which have allowed complex processing and network connectivity to be achieved in the smallest of physical devices, such as a smart phone, for relatively small cost and effort.

One business model that has not advanced to any significant degree is the restaurant industry. True, consumers can pre-order online, make reservations online, view menus online, and the like; but, the onsite physical experience associated with the meal has not advanced to any significant degree. This situation is not strictly tied to the restaurant experience as it can be said to be the case with just about any physical retail/entertainment establishment as well.

Consider for example consumer checkout experiences at retail/entertainment establishments. In typical restaurant and similar retail/entertainment environments, a paper check or bill of goods is used for purposes of requiring that the customer surrender his/her credit card, or for requiring that a merchant employee physically visit the customer with a portable payment terminal (popular at entertainment venues, such as concerts, sporting events, and the like). This arrangement is not necessarily optimal for a variety of reasons.

For instance, often a customer may be having an enjoyable experience at the establishment only to have the entire affair be tarnished when the waiter/agent goes on break after delivering the bill or gets too busy with other customers to timely attend to completing the payment transaction to the satisfaction of the customer. Additionally, providing a payment card to the waiter/agent poses a variety of security risks to the customer. For example, details of the payment card may be unscrupulously acquired by the waiter/agent or someone else that handles or has visual or physical access to the payment card after the customer surrenders it for payment. Security risks exists even if the card itself is not compromised by someone at the facility, since receipts are often printed and managed at the facility and the receipts may have confidential information that can be acquired by third-parties.

Even when the payment experience is automated by a facility with Near Field Communication (NFC), the facility must have a NFC-compatible payment terminal, which is inconvenient for the facility because of the hardware, software, and support expense associated with having NFC-enabled devices on site. Moreover, in order for the customer to use the NFC mechanism, the customer's smart phone has to have stored sensitive information on the customer's smart phone, such as: credit card numbers, loyalty numbers and so forth. Even the best software is still subject to potential hacking and compromise if the smart phone is acquired or if a remote connection can be made to the smart phone. Furthermore, typical mobile loyalty solutions rely on an operator to scan a mobile device or loyalty card at the time of a purchase for purposes of loading the loyalty information into the Point-Of-Sale (POS) system or the retail web site.

SUMMARY

In various embodiments, techniques for automating a retail transaction are presented. According to an embodiment, a method for an automated transaction is provided.

Specifically, a unique transaction code is received from a mobile device and a retailer and a transaction are identified and tied to that unique transaction code. Next, a customer identifier is determined to link to the unique transaction code to a specific customer and payment details are obtained from the specific customer via the mobile device of the specific customer. Then, payment to the retailer is facilitated using the payment details and completion of the transaction is confirmed to both the retailer and the specific customer.

DETAILED DESCRIPTION

Figure 1:
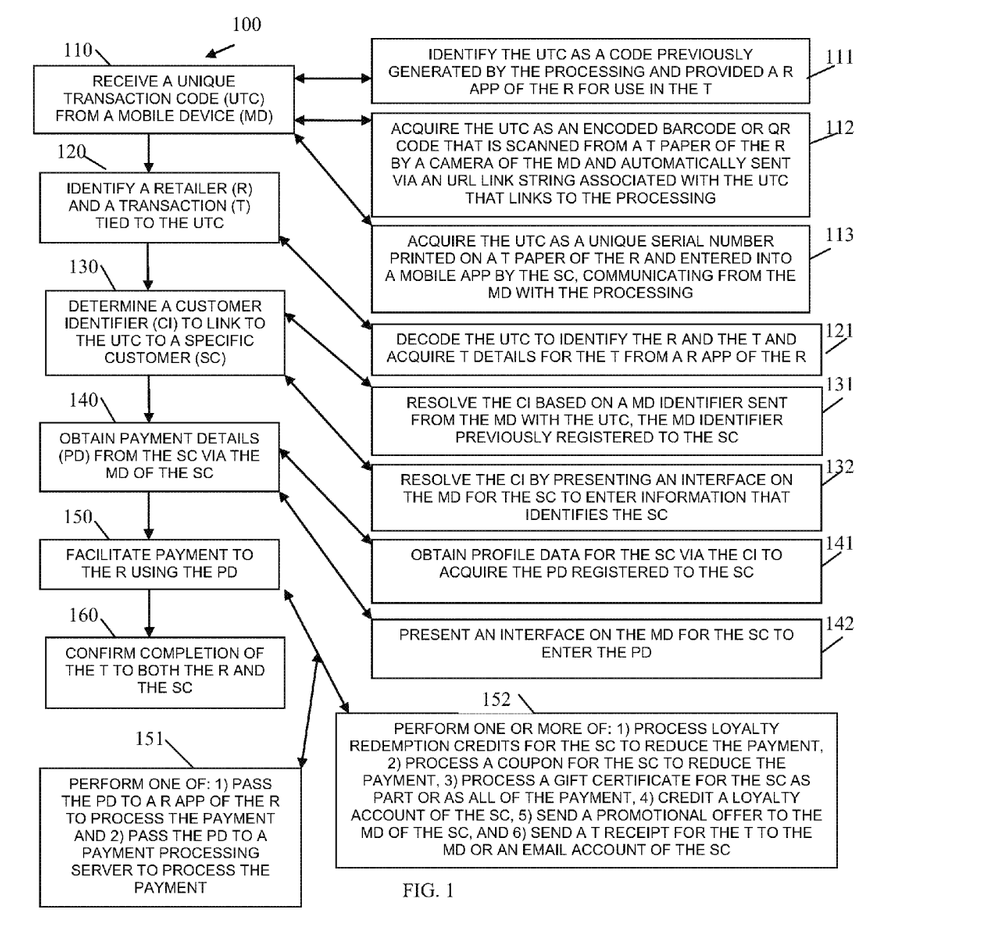
FIG. 1 is a diagram of a method for an automated transaction with an enterprise system, according to an example embodiment.

FIG. 1 is a diagram of a method 100 for an automated transaction with an enterprise system, according to an example embodiment. The method 100 (hereinafter "mobile transaction service") is implemented as instructions programmed and residing on a non-transitory computer-readable (processor-readable) storage medium and executed by one or more processors. The processors are specifically configured and programmed to process the mobile transaction service. The mobile transaction service operates over a network. The network is wired, wireless, or a combination of wired and wireless.

The mobile transaction service executes on one or more processors of a server. In some embodiments, the mobile transaction service operates in a cloud processing environment and is available as a cloud service over the Internet to enterprises and consumers.

The processing of the mobile transaction service interacts with consumer mobile device apps (discussed in detail with reference to the FIG. 2), applications and services of enterprise POS systems (discussed in detail with reference to the FIG. 3), and/or other third-party services utilized by consumers and/or enterprises for transaction processing, loyalty processing, and/or other customer relationship management processing.

As will be more fully explained herein and below, the techniques and embodiments presented below provide a novel mechanism to enable a consumer to perform an automated transaction with an enterprise.

The techniques herein provide mechanisms that enable a consumer (customer or user) to pay for his/her transaction without requiring: a mobile Point-Of-Sale (POS) terminal, a credit/debit card to be surrendered, an Near Field Communication (NFC) tap, or an imaging scanner to read a barcode off of the phone. Instead, a POS terminal/system prints a two-dimensional (2D) barcode or Quick Response (QR) code on a bill or a check along with the transaction details. The merchant provides this to the consumer, who scans the code with his/her mobile device, accomplishing the same end result. The printed imaged code is linked with the consumer's mobile phone, which can then be directed for payment of the transaction, via the mobile transaction service (represented by the FIG. 1).

Furthermore, this also establishes a link between the consumer's mobile device and the transaction with the retailer—such that the mobile device of the consumer can be used as a User Interface (UI) to allow the consumer to leave a tip, answer questions, redeem points, etc. right, via his/her mobile device. The consumer can also receive his/her receipt on the mobile device electronically, reducing the need for multiple copies of the receipt. This approach reduces the number of pieces of paper for a typical credit transaction at a retail establishment from the typical three (check, merchant/retailer receipt, customer receipt) to one single piece of paper.

Optionally and in a restaurant scenario, the merchant (the terms "merchant," "retailer," and "enterprise" may be used synonymously and interchangeably herein) can bring a bar-coded check to the table at the beginning of a meal and the consumer can use the mobile device to interact with the order or to check the transaction accuracy, etc. during the meal.

In another scenario, if the POS system is equipped with a 2D-capable barcode reader, the check can be used again at the POS to close the table and finalize the transaction.

From an overall perspective of the techniques presented herein, there are three main components: the mobile transaction service (discussed here with reference to the FIG. 1 and its processing components); the mobile app on a consumer's mobile device (discussed in detail below with reference to the processing components of the FIG. 2); and a POS system (discussed in detail below with reference to the retail app and its processing components of the FIG. 3).

Before detailed discussion of the mobile transaction service is presented, the overall interaction of these three main components with each other and some sample scenarios and embodiments are presented for purposes of illustration and comprehension.

In an embodiment, a POS system (via a retailer app of the FIG. 3) of a merchant initially calls the secure mobile transaction service (may also include loyalty processing features for the retailer) with a transaction Identifier (ID), unique location ID, and/or any other relevant information about the transaction. It is noted that in a restaurant environment this may occur either before or after transaction itemization; in the United States of America (U.S.), the typical model is to print at the end—though there may be utility in allowing the customer to interact with the transaction at the beginning of the transaction as well.

The mobile transaction service returns barcode and string data containing the portal Uniform Resource Locator (URL) and the unique transaction ID; optionally, digitally signed with a private key of the relevant merchant.

The POS system optionally prints an open check with the barcode or string such that the consumer's mobile device (via the mobile app of the FIG. 2) can acquire the string.

The POS system calls the mobile transaction service and blocks this particular transaction while awaiting loyalty/identity information and/or profile data for the consumer/customer associated with the transaction.

The consumer uses retailer/merchant or mobile transaction/loyalty service app to acquire the string via barcode or other mechanism.

In an alternate scenario to what was just described, it may be that the POS system (via the retailer app of the FIG. 3) generates and distributes the barcode or QR code without interaction to the mobile transaction service and includes an URL to the mobile transaction service. The code's format is recognizable to the mobile transaction service or can be used to consult a backend retailer system to get the format or to be decoded for the mobile transaction service. So, when the mobile app presents code to the mobile transaction service, the mobile transaction service can identify all the details of the retailer, the consumer, and the transaction because the consumer presents the code with a mobile device token registered to the mobile transaction service as being associated with the consumer. So, it is to be understood that in some cases the creator and distributor of the initial code for the transaction can be the mobile transaction service or the POS system, either situation will work.

But, it should also be noted that the mobile transaction service does not necessarily need to know the identity of the consumer and does not need a mobile device identifier when the mobile app sends the code to the mobile transaction service. So, the consumer does not have to be pre-registered for using the mobile transaction service. This is so, because (as is discussed below with some embodiments), the mobile transaction service may present an interface to the consumer via a website to acquire specifics on the consumer.

Continuing with the overall processing discussion now, the mobile app connects to the mobile transaction/loyalty service via secure connection, either through existing Over-The-Air (OTA) data connection, WiFi, Short Message Service (SMS), or other mechanism and presents the string or code and, optionally, a mobile device identifier (previously acquired mobile device token, Media Access Control (MAC) identifier, and the like).

Optionally, the consumer authenticates via their mobile device with a secret, such as a Personal Identification Number (PIN), secure element token, biometrics or other mechanism.

Now, presence of a specific consumer is established, and the mobile transaction/loyalty service returns the profile information and/or loyalty data (if available) to the blocked transaction processing. In the case where the consumer did not send, via the mobile device, a mobile device identifier and was not pre-registered with the mobile transaction service, a website interface may be presented on the mobile device of the consumer to identify the consumer and to then acquire the profile and loyalty information for the retailer, if such information exists because for the techniques to work herein there is no requirement a consumer have such an account or even be known to the retailer in advance. However, the mobile transaction service has information to uniquely identify the consumer via: a previously registered account with the retailer, the mobile transaction service, or details entered by the consumer via a website interface presented by the mobile transaction service to the consumer on the mobile device.

Optionally, the communication session with the mobile transaction service and the mobile app of the consumer can be used for further interactions on the mobile device, such as tendering, coupon redemption, loyalty point redemption, etc. during the transaction.

Optionally, the POS system sends transaction details during or at the end of the transaction, enabling further interaction with the mobile device.

Optionally the POS system acquires and/or prints the barcode along with the closed check at the end of the transaction, allowing for a typical U.S. restaurant credit card interaction.

Optionally, the mobile device maintains a connection to the mobile transaction service to receive transaction updates, an electronic receipt or other information related to the transaction.

Consider the following use case(s) as well for purposes of comprehension of the overall processing of the components discussed herein.

A retailer's POS system is enhanced to print an encoded token (barcode, tag, QR code, etc.) on a transaction receipt, which is presented to the consumer.

Although, the discussion heretofore has discussed using a camera of a mobile device to scan a code, it should be noted that in some embodiments the mobile app (the FIG. 2) may allow the consumer to simply enter a retailer assigned number assigned by the retailer for the transaction with the transaction details for the number housed or available via a backend retailer system and capable of being linked to via the mobile transaction service that receives the number from the consumer via the mobile app. The mobile transaction service may service multiple retailers and the number can provide an identifier for the particular backend retailer system. Alternatively, the consumer can use the mobile app to select a specific retailer and then enter the POS generated transaction number. The point here is that there is a variety of mechanisms besides a code scan that can achieve the same result as has been discussed heretofore and these mechanisms are intended to fall within the scope of various embodiments of this invention.

So, in an embodiment, the consumer uses his/her smart phone camera to capture (scan) the code, which encapsulates details of the bill/check and an URL link to the mobile transaction service.

A browser application on the smart phone presents the consumer with a payment transaction from the retailer, which the consumer then interacts with to pay the bill/check, via the consumer's smart phone. Optionally, profile data for the retailer may already provide the specific payment details that the consumer wishes to use and a summary may be presented to the consumer via the mobile device for the consumer to confirm usage of those preferred payment details or for the consumer to change and enter different payment details.

The POS system and/or the mobile transaction service provide an electronic receipt to the consumer, which is emailed to the consumer's account and/or sent as a test message to the smart phone.

The POS system and/or the mobile transaction service can optionally push a voucher/coupon to the consumer and provide metrics back to a retailer's backend system regarding the goods/service sold.

Optionally, the consumer is also provided a paper receipt with another printed code containing promotional information/opportunities from the retailer and/or provider of the mobile transaction/loyalty service.

With this context, the initial component of the overall processing to automate a retail transaction is presented with reference to the processing of the mobile transaction service and the processing elements of the FIG. 1.

At the outset, it is noted that the mobile transaction service can actually be implemented as part of a particular retailer's backend system and integrated within the backend system. Alternatively, the mobile transaction service can be an independent third-party service offered to retailers and consumers and may or may not charge and collect transaction fees or may be provided on a subscription bases to retailers and/or consumers.

At 110, the mobile transaction service receives a unique transaction code from a mobile device. This is a mobile device of a consumer (user or customer) that is present at a retail establishment (such as a restaurant, sporting venue, entertainment venue and the like).

According to an embodiment, at 111, the mobile transaction service identifies the unique transaction code as a code that was previously generated by the mobile transaction service and provided by a retailer app of the retailer for use in a transaction between the customer and the retailer.

In another case, at 112, the mobile transaction service acquires the unique transaction code as an encoded barcode or QR code that is canned from a transaction paper of the retailer by a camera of the mobile device and then is automatically sent via an URL link string with the transaction code, which links the transaction to the mobile transaction service.

In another situation, at 113, the mobile transaction service acquires the unique transaction code as a unique serial number printed on a transaction paper of the retailer and entered into a mobile app by the specific customer. The mobile device, via the mobile app, communicates directly with the mobile transaction service over a network connection, such as cellular, satellite, WiFi, and the like.

At 120, the mobile transaction service identifies a particular retailer and a particular transaction that is to be tied, mapped, and linked to the unique transaction code.

In an embodiment, at 121, the mobile transaction service decodes the unique transaction code to identify the particular retailer and transaction details for the particular transaction, which are acquired from a retailer app of the retailer (discussed below with reference to the FIG. 3).

At 130, the mobile transaction service determines a customer identifier for purposes of linking, mapping, and associating the unique transaction code to a specific customer. This can be achieved in a variety of manners.

For example, at 131, the mobile transaction service resolves the customer identifier based on a mobile device identifier sent from the mobile device with the unique transaction code at 110. The mobile device identifier previously registered to the specific customer. The mobile device identifier can be a unique mobile device token or certificate assigned to the specific customer and/or a MAC identifier for the mobile device registered to the specific customer and his/her mobile device.

In another case, at 132, the mobile transaction service resolves the customer identifier by presenting an interface on the mobile device (such as via the mobile app or via a website interface in a browser app of the mobile device) for the specific customer to enter information that uniquely identifies the specific customer for purposes of creating or obtaining the customer identifier.

At 140, the mobile transaction service obtains payment details from the specific customer, via the mobile device of the specific customer. This may also occur in a variety of manners.

For example, at 141, the mobile transaction service obtains profile data for the specific customer, via the customer identifier, to obtain the payment details, which are preregistered to the specific customer.

In another situation, at 142, the mobile transaction service presents an interface on the mobile device (again via the mobile app or via a website interface presented in a browser app of the mobile device) for the specific customer to enter, via the interface, the payment details.

At 150, the mobile transaction service facilitates payment to the retailer using the payment details. This can occur in a variety of ways.

For example, at 151, the mobile transaction service can also perform one of: 1) passing the payment details to a retailer app of the retailer for the retailer to process payment for the transaction; and 2) passing the payment details to a payment processing server to process the payment for the transaction (the payment processing server can be tied to a third-party payment service or to a specific financial institution's payment service).

In another scenario, at 152, the mobile transaction service can perform one or more of: 1) processing loyalty redemption credits for the specific customer to reduce the payment for the transaction; 2) processing a coupon for the specific customer to reduce the payment of the transaction; 3) processing a gift certificate for the specific customer as part or all of the payment for the transaction; 4) crediting a loyalty account of the specific customer for the transaction; 5) sending a promotional offer to the mobile device of the specific customer; and 6) sending a transaction receipt for the transaction to the mobile device or an email account of the specific customer.

At 160, the mobile transaction service confirms completion of the transaction to both the retailer and the specific customer. Confirmation to the retailer achieved directly to a backend system of the retailer or indirectly via the payment service used at 150. Confirmation to the specific customer achieved via a mobile app processing on a mobile device of the customer or via a website page that is being interacted with by the customer using a browser app that processes on the mobile device of the customer.

Figure 2:
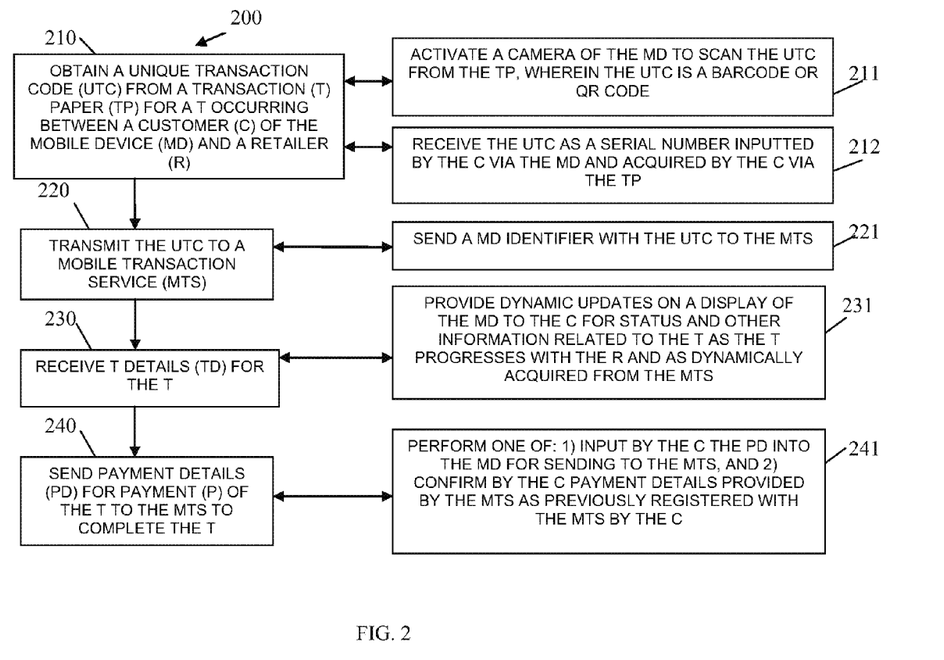
FIG. 2 is a diagram of another method for an automated transaction with an enterprise system, according to an example embodiment.

FIG. 2 is a diagram of another method 200 for an automated transaction with an enterprise system, according to an example embodiment. The method 200 (hereinafter "mobile app") is implemented as instruction and programmed within a non-transitory computer-readable (processor-readable) storage medium that executes on one or more processors of a mobile device (e.g., mobile phone, personal digital assistant (PDA), tablet, laptop, etc.); the processors of the mobile device are specifically configured to execute the mobile app. The mobile app is operational over a network; the network is wired, wireless, or a combination of wired and wireless.

The mobile app is controlled by a consumer (again, customer and/or user—the terms "consumer," "customer," and/or "user" may be used synonymously and interchangeably herein) and interacts with the mobile transaction service, represented by the method 100 of the FIG. 1 and may also interact with a POS system of a specific retailer via a retailer app (discussed below with reference to the FIG. 3).

It is noted that the mobile app can be installed and initiated by the consumer on the mobile device in a variety of manners before the processing occurs as detailed below. For instance, in one situation during a registration process of the mobile device with a mobile transaction service, the mobile app is downloaded and initiated on the mobile device. In another instance, during an initial contact by the mobile device by activating a barcode, QR code, number inputted, etc. for a first time, the mobile transaction service is automatically contacted and downloads and installs the mobile app on the mobile device and initiates a registration process. The remaining processing described for the mobile app assumes the mobile app is installed and executing on a mobile device of a consumer.

At 210, the mobile app obtains a unique transaction code from a transaction paper (such as receipt printed at the retail establishment) for a transaction occurring between a customer and a retailer. This occurs via the mobile device that the mobile app is processing on.

According to an embodiment, at 211, the mobile app activates a camera of the mobile device to scan the unique transaction code from the transaction paper. The unique transaction code is a barcode or a QR code.

In a different scenario, at 212, the mobile app receives the unique transaction code as a serial number inputted by the customer via the mobile device and acquired by the customer via the transaction paper.

At 220, the mobile app transmits the unique transaction code to a mobile transaction service over a network connection, such as Bluetooth, WiFi, cellular, satellite, and the like.

In an embodiment, at 221, the mobile app sends a mobile device identifier (token, certificate, and/or MAC identifier) to the mobile transaction service (such as the mobile transaction service described above with reference to the method 100 of the FIG. 1).

At 230, the mobile app receives transaction details from the transaction. The transaction details defined by the retailer and can include a variety of information, such as and by way of example only, name and location of retail establishment, server's name, date and time, itemized listing of goods and services with prices identified, tax, and a total price.

According to an embodiment, at 231, the mobile app provides dynamic updates on a display of the mobile device to the customer for status and other information related to the transaction as the transaction progresses with the retailer and as dynamically acquired from the mobile transaction service or a retailer backend system connected via the mobile transaction service to the mobile app. So, and as one example, the status of an order can be presented and an itemization of the order provided.

At 240, the mobile app sends payment details for payment of the transaction to the mobile transaction service to complete the transaction. This can occur in a variety of manners.

Thus, at 241, the mobile app can perform one of the following in sending the payment details for the payment of the transaction: 1) inputting, by the customer and into the mobile device the specific payment details for the payment, which is then sent to the mobile transaction service for processing; and 2) confirming, by the customer on the mobile device the payment details, which are provided to the customer from the mobile transaction service and which are previously registered with the mobile transaction service by the customer. So, the customer can provide the payment details or confirm the payment details or even override with new payment details previously registered and preferred payment details of the customer.

Figure 3:
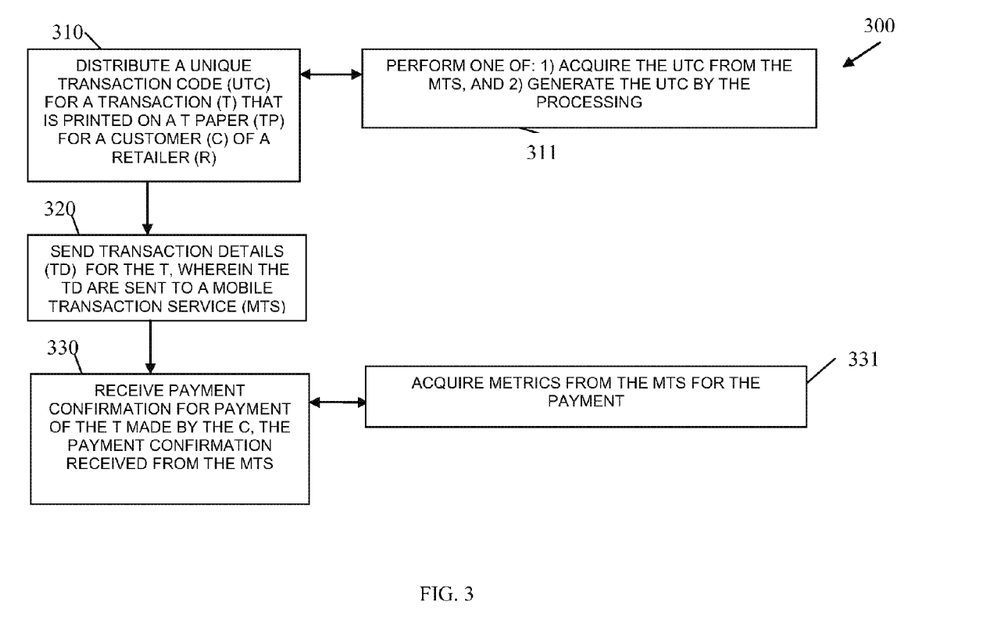
FIG. 3 is a diagram of yet another method for an automated transaction with an enterprise system, according to an example embodiment.

FIG. 3 is a diagram of yet another method 300 for an automated transaction with an enterprise system, according to an example embodiment. The method 300 (hereinafter "retail app") is implemented as executable instructions and programmed within a non-transitory computer-readable (processor-readable) storage medium that executes on one or more processors of an enterprise device/server (POS system); the processors of the enterprise device/server are specifically configured to execute the retail app. The retail app is operational over a network; the network is wired, wireless, or a combination of wired and wireless.

The FIG. 1 described the processing for automating a transaction as a whole and provided specific processing details from the perspective of the mobile transaction service. The FIG. 2 described the processing from the perspective of the consumer's mobile app on a consumer's mobile device; and the retails of the FIG. 3 (discussed here) describes the processing from an enterprise's POS system processing on an enterprise device (enterprise backend system that communicates and is networked to POS terminals for the enterprise/retailer. A transaction process is automated and customized via the interaction among the mobile transaction service (of the FIG. 1), the mobile app (of the FIG. 2), and the retail app (of the FIG. 3). It is also noted that the processing of the mobile transaction service and the retail app may be implemented as one service, such that the two do not have to be in all cases two independent and separate systems.

At 310, the retailer app distributes a unique transaction code for a transaction that is printed on a transaction paper for a customer of a retailer at a retail establishment for the transaction occurring between the customer and the retailer.

In an embodiment, at 311, the retailer app can perform one of: 1) acquiring the unique transaction code from a mobile device transaction service (such as the mobile device transaction service represented by the method 100 of the FIG. 1); 2) generating the unique transaction code by the retailer app for use with the transaction.

At 320, the retailer app sends transaction details for the transaction to the mobile transaction service. This can also include dynamic updates on status and other information for the transaction as it completes and even before the transaction is completed or near completion with the customer.

At 330, the retailer app receives payment confirmation for payment of the transaction made by the customer. The payment confirmation received from the mobile transaction service.

According to an embodiment, at 331, the retailer app also acquires metrics from the mobile transaction service for the payment transaction. It may also be that a survey is presented by the mobile transaction service to the customer at the conclusion of the transaction and the customer survey results are sent as part of the metrics to the retail app. So, the metrics can provide feedback to the retailer as well as provide information on efficiency and performance of transaction processing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors of a server configured to execute the method, comprising:

receiving, at the server over a Short Message Service (SMS) connection, a unique transaction code from a mobile device, and linking the unique transaction code to the mobile device, and wherein the mobile device uses a camera to capture the transaction code printed on a check for a transaction of a specific customer, wherein receiving further includes obtaining during the SMS connection a secure element token that authenticates the specific customer;

identifying, at the server, a retailer and the transaction tied to the unique transaction code;

determining, at the server, a customer identifier to link the unique transaction code to the specific customer based on the secure element token, and the mobile device is not pre-registered for access to the method and the secure element token is a certificate assigned to the customer;

obtaining, at the server, payment details from the specific customer via the mobile device of the specific customer over the SMS connection, wherein obtaining further includes obtaining the payment details from the specific customer without the specific customer having to perform any of the following: access a mobile Point-Of-Sale (POS) terminal, surrender a credit/debit card for payment, tap the mobile device using an Near Field Communication (NFC) tap, and scan a barcode off of the mobile device;

facilitating, from the server, payment to the retailer using the payment details, wherein facilitating further includes passing the payment details to a retail app processing on the POS terminal to process the payment, and wherein facilitating further includes processing loyalty redemption credits for the specific customer to reduce the payment, processing a coupon for the specific customer to reduce the payment, processing a gift certificate for the specific customer as part or as all of the payment, crediting a loyalty account of the specific customer, sending a promotional offer to the mobile device of the specific customer, and sending a transaction receipt for the transaction to the mobile device or an email account of the specific customer;

permitting, from the server, the customer through SMS communications to add a tip to the payment, redeem loyalty points for at least a portion of the payment, and answer questions relevant to a survey presented from the server on the mobile device; and confirming, from the server, completion of the transaction to both the retailer and the specific customer.

2. The method of claim 1, wherein receiving further includes identifying the unique transaction code as a code previously generated by the retailer and provided by a retail app of the retailer for use in the transaction.

3. The method of claim 1, wherein receiving further includes acquiring the unique transaction code as a unique serial number printed on a transaction paper of the retailer and entered into a mobile app by the specific customer, the mobile app communicating from the mobile device with the server having data associated with processing the method.

4. The method of claim 1, wherein identifying further includes decoding the unique transaction code to identify the retailer and the transaction and acquiring transaction details for the transaction from a retailer app of the retailer.

5. The method of claim 1, wherein determining further includes resolving the customer identifier by presenting an interface on the mobile device for the specific customer to enter information that identifies the specific customer.

6. The method of claim 1, wherein obtaining further includes obtaining profile data for the specific customer via the customer identifier to acquire the payment details registered to the specific customer.

7. The method of claim 1, wherein obtaining further includes presenting an interface on the mobile device for the specific customer to enter the payment details.

* * * * *